United States Patent Office 3,373,146
Patented Mar. 12, 1968

3,373,146
MERCAPTAN TERMINATED POLYMERS
Glen E. Meyer, Kent, Arthur H. Weinstein, Hudson, Albert J. Costanza, Akron, and Richard J. Coleman, Uniontown, Ohio, assignors to The Goodyear Tire & Rubber Company, Akron, Ohio, a corporation of Ohio
No Drawing. Continuation-in-part of application Ser. No. 329,231, Dec. 9, 1963. This application Nov. 25, 1966, Ser. No. 596,751
6 Claims. (Cl. 260—79.7)

This is a continuation-in-part of Ser. No. 329,231 filed Dec. 9, 1963, now abandoned.

This invention relates to the cleaved product obtained by the hydrogenolysis of the polymer obtained by the copolymerization of sulfur with a conjugated diene either alone or in conjunction with a mono-alpha-olefin of the type hereinafter described. More particularly, this invention relates to the cleaved product of a copolymer of sulfur and at least one conjugated diene, said cleaved product being characterized by terminal mercapto groups and the ability to react with lead dioxide to yield a cured product which has a solubility at 75° F. in benzene of less than about 30% by weight. More specifically, this invention relates to the preparation of a storage-stable composition from the cleaved product of a copolymer of sulfur and at least one diene.

Since liquid casting systems offer certain manipulative and fabrication advantages, a liquid casting system based on the relatively inexpensive dienes and sulfur would be very desirable. When it was attempted to prepare such a system by copolymerizing sulfur with olefinic materials such as a diene alone or conjointly with mono-alpha-olefins, a polymeric product of a plastic or elastogenic nature was obtained. These plastic or rubbery copolymeric products contain sulfur atoms interspersed within the carbon-to-carbon backbone of the polymer either as single sulfur atoms or in groups up to about 8 atoms with the more common numbers being 2, 3 and 4. Since these polymeric products are extremely high molecular weight solids, they cannot be used per se in making liquid castings but have to be pressure formed and cured to obtain valuable manufactured articles.

An object of this invention is to cleave by hydrogenolysis these plastic or rubbery copolymers of sulfur and olefinic materials to obtain a low molecular weight polymer having at least two reactive mercapto groups and containing essentially a polydiene type structure except for the interspersed sulfur atoms in the chain. Said low molecular weight polymer being useful per se or as an intermediate in the preparation of chemicals also useful in a liquid casting system.

The objects of this invention are accomplished by taking a copolymer of sulfur and at least one diene, treating this copolymer with a solvent to cause the copolymer to swell and then treating the swollen polymer with a hydrogenolysis cleaving agent such as the alkali aluminum hydrides or a combination of metallic zinc and a non-oxidizing mineral acid, for instance, hydrogen chloride. The hydrogenolysis cleaving agent cleaves the sulfur-to-sulfur bond in the groups of sulfur atoms in the polymer backbone to yield to polymeric product of lower molecular weight, usually about 500 to 10,000 and preferably 1,000 to 5,000. This lower molecular weight polymer also contains at least two mercapto groups per molecule, some monosulfide sulfur in the carbon-to-carbon chain of the cleaved polymer molecule and at least one double bond. The cleaved liquid polymers of this invention have viscosities at 25° C. of from about 20,000 to 100,000 centipoises. The cleaved liquid polymer will contain at least one carbon-to-carbon double bond for each 1,000 units or molecular weight.

These copolymers of sulfur and a conjugated diene per se or of sulfur, a conjugated diene and a mono olefin can be represented by the following sulfur-hydrocarbon general formula:

$$M_a(S_xM_b)_yS_t$$

where M is a monomer unit derived from a conjugated diene having from 4 to about 8 carbon atoms, for example, butadiene, ethyl butadiene, propyl butadiene, isoprene and pentadiene-1, 3 and a mono alpha olefin having from 2 to 20 and preferably 2 to 10 carbon atoms such as styrene and those cited herein, S is sulfur, $a$, $b$ and $y$ are intergers having values from 1 to 100 or more and with the sum of $a$, $b$ and $y$ being sufficient to give a molecule having a molecular weight of at least about 50 to 100 thousand, and $x$ and $t$ being integers having values of 0 to 8.

The hydrogenolitic cleaved $M_a(S_xM_b)_yS_t$ polymer may be represented by the following formula:

$$HSM_p(S_xM_q)_kSH$$

where M is a monomer unit obtained from a conjugated diene having from 4 to 8 carbon atoms and alpha olefins having from 2 to 20 and preferably less than 10 carbon atoms, $p$, $q$, and $k$ are integers having values of 1 and higher with the sum of $p$, $q$ and $k$ being less than those values which give the cleaved mercaptan terminated polymer a molecular weight greater than about 10,000 and $x$ has values of from 0 to 8 with the proviso that at least some of the $x$'s have values of at least 1 and preferably no more than 1. In general, $k$ will have values of less than about 119.

The solvents useful in the cleaving step of this invention are those capable of swelling the sulfur copolymer, but are inert to the hydrogenolysis agents being used. When the zinc-hydrochloric acid combination is used it is necessary that some water be present so mixtures of a water miscible and water immiscible solvents such as benzene and ethanol, toluene and isopropanol, toluene and ethanol, benzene and acetic acid, or xylene and ethanol are desired to promote water wetting of the swelled polymer.

When lithium aluminum hydride is used it is necessary to operate under anhydrous conditions and in the absence of compounds possessing active hydrogens such as alcohols and acids. Aromatic solvents such as benzene and toluene, etc., as well as aliphatic solvents such as hexane, heptane, cyclohexane, etc. may be used for swelling the polymer. Ethers such as tetrahydrofuran, diethylether may be used to dissolve the lithium aluminum hydroxide so it may be added to the swollen polymer conveniently as a solution. The preferred solvents are heptane for swelling the polymer and tetrahydrofuran for dissolving the lithium aluminum hydride. The preferred solvents boil between about 30° C. and 225° C.

The rubbery copolymers of dienes, having 4 to about 8 carbon atoms such as butadiene and isoprene, with sulfur, are well known and may be prepared by emulsion polymerization with free radical polymerization initiator such as benzoyl peroxide or potassium persulfate, which generically are referred to herein as peroxy initators. The treatment of the copolymer of sulfur and a diene either as a latex or a dry solid with a suitable solvent and with a mixture of a non-oxidizing mineral acid and zinc as the hydrogenolysis cleaving agent cleaves the sulfur bonds to yield polymer segments having terminal mercaptan groups. Alternately the latex can be treated to coagulate the polymer and then the coagulated polymer can be cleaved with the above combination of agents while still wet or after it has been dried. It should be noted that where lithium aluminum hydride is the cleaving agent both the solvent and the polymer should be essentially anhydrous.

The present invention may be more fully understood from the following illustrative examples representative of the many combinations of diene monomers and mono alpha olefins which can be used to produce the cleaved polymers of this invention and to stabilize them for storage. The parts and percentages are by weight unless otherwise designated.

EXAMPLE I

*Preparation of sulphur containing polymer*

A typical polymerization recipe was as follows:

| | |
|---|---|
| Water _____parts__ | 200 |
| Fatty alcohol sodium sulfate _____do__ | 4 |
| Potassum persulfate _____do__ | 0.4 |
| Tetrasodium ethylene diamine tetra actate ____do__ | 0.9 |
| Iso octyl phenoxy polyethoxy ethanol non-ionic emulsifier _____do__ | 2 |
| KCl _____do__ | 1 |
| Hydrochloric acid (conc) _____do__ | 0.13 |
| Sulfur _____ | Variable |
| Isoprene _____do__ | 100 |
| Hydroquinone (shortstop) _____ | 0.15 |

Sulfur, in the form of a 35% dispersion in water, was charged after the reactor had been sealed and just prior to charging the isoprene. The reactor temperature at the start of the polymerization was 130° F. and then gradually was raised in 5° steps, to 150° F. during the first two hours of the polymerization. The shortstop was added after the desired conversion had been reached.

The latices listed below were made at the sulfur level indicated with the above recipe and procedure. The shortstop was added at the indicated conversion.

Latex 8014—Total sulfur, 4.75 parts, one-half charged initially and the remainder charged at about 25% conversion. Final conversion, 70%.

Latex 8098—Total sulfur, 2 parts, charged initially. Final conversion, 65%.

Latex 8140—Total sulfur, 2 parts, charged initially. Final conversion, 25%.

Latex 8257—Total sulfur, 3.99 parts, 1.33 parts charged initially and 1.33 parts charged at both 20 and 40% conversion. Final conversion, 65%.

EXAMPLE II

*Cleaving the polymer without isolating from latex*

Latex 8257, containing 100 grams of polymer was placed in a 3 liter Erlenmeyer flask equipped with a mechanically driven agitator. After starting the agitator, the following ingredients were added:

| | |
|---|---|
| Ditertiary butyl hydroquinone _____gram__ | 1 |
| Benzene _____ml.__ | 1000 |
| Zinc dust _____gram__ | 50 |
| Isopropanol _____ml.__ | 500 |

After 15 minutes agitation, 150 ml. of concentrated HCl was added incrementally during a period of one hour. Agitation was continued for one hour after the last addition of HCl. The reaction mixture was permitted to stand until it separated into two nearly clear liquid layers with some dark residue on the bottom of the flask. The upper layer, benzene solution containing the cleaved polymer, was separated and treated with a quantity of anhydrous sodium sulfate to remove dissolved water. Another gram of ditertiary-butyl hydroquinone, the stabilizer, was added to the benzene solution containing the cleaved polymer. Then the benzene was evaporated from the solution at room temperature to obtain 85 grams of the cleaved liquid polymer.

Analysis of the polymer indicated 4.42% by weight of mercaptan sulfur in the polymer. The dry polymer from another batch of this latex was cleaved with lithium aluminum hydride and worked up to obtain a liquid polymer, which contained 4.4% mercaptan sulfur.

EXAMPLE III

*Cleaving the wet coagulum containing dispersed zinc dust*

Zinc dust, 40 parts, was stirred into Latex 8257 which contained 100 parts of polymer. Sufficient isopropanol was added to the latex to coagulate it. The serum was decanted and the coagulum was pressed to squeeze out the readily removable serum. The wet coagulum was broken into small lumps and added to 850 parts of benzene in a glass reactor equipped with a mechanically driven agitator. After 15 minutes stirring 1 part of ditertiary-butyl hydroquinone was added to the benzene dispersion of the swollen polymer. Concentrated HCl (150 parts) was added incrementally to the flask. Since the polymer was already wet with isopropanol from the coagulation step, more polar solvent was not required. From this point, the procedure was the same as described in Example II. The cleaved polymer contained 4.30% mercaptan sulfur.

EXAMPLE IV

*Cleaving dry polymer at elevated temperature*

Sufficient isopropanol was added to Latex 8140 to cause complete coagulation. The wet coagulum was rinsed once with isopropanol. After pressing to remove excess serum, the coagulum was dried in an air circulating oven for 4 hours at 150° F. The isopropanol used in this example contained 1 part of phenyl beta naphthylamine as an antioxidant, per hundred parts of polymer.

The dry polymer, 40 parts, was placed in a glass reactor equipped with an electric heating mantle, reflux condenser, dropping funnel, and mechanically driven agitator. A mixed solvent consisting of 160 parts of benzene and 110 parts of glacial acetic acid was added to the flask and the mixture was heated at reflux until the polymer was dissolved. The agitator was started before 15 parts of zinc dust was added to the polymer solution and then the dropwise addition of concentrated HCl was begun. A total of 25 parts of HCl was added over a period of 3 hours while the rate of addition was controlled to prevent excessive foaming. After 3 hours of additional refluxing, 0.4 part of di(tertiarybutyl) hydroquinone as an antioxidant and stabilizer was added. The mixture was cooled to room temperature and the organic layer was separated from the aqueous layer containing the black residue. A benzene extract obtained from the extraction of the aqueous layer was combined with the organic layer. The entire benzene layer was washed 3 times with a 5% by weight NaCl brine solution, then with water until neutral and dried over anhydrous sodium sulfate. Upon evaporating the solution "in vacuo" at less than 120° F., 34.6 parts of a liquid polymer having 3.0% mercaptan sulfur was obtained. A sample of the original uncleaved polymer, after extraction with acetone to remove any uncombined sulfur had a total sulfur content of 5.4%.

EXAMPLE V

*Cleaving of dry polymer at room temperature*

Starting with 30 parts of dry polymer from Latex 8140 and following the procedure described in Example IV except maintaining the reaction mixture at room temperature during the addition of the concentrated HCl, 27.3 parts of a liquid polymer having 3.95% mercaptan sulfur content was obtained. Total sulfur in the liquid polymer was 4.8%.

EXAMPLE VI

*Cleaving sulfur isoprene copolymer*

A latex of an isoprene sulfur copolymer made by the procedure of Example I with 4 parts of sulfur and shortstopped at about 40% conversion of the isoprene was cleaved by the procedure of Example II. The cleaved liquid polymer had a viscosity of 60,000 centipoises at 25° C. and a mercaptan sulfur content of 3.6%.

Part of the cleaved liquid polymer was stabilized with 2 parts of di(tertiarybutyl) hydroquinone as an antioxidant per 100 parts of liquid polymer. The stabilized polymer had a mercaptan sulfur content of 3.35% after 3 months storage in a closed glass container at room temperature but the unstabilized sample had lost more than 50% of its original mercaptan sulfur content at the end of this storage period and was no longer able to be effectively cured at room temperature with lead dioxide.

EXAMPLE VII

*Cleaving of polymer with LiAlH$_4$*

Dry polymer, 50 parts, obtained by coagulation of Latex 8140 with isopropanol, was swollen in 600 parts of heptane in a glass reactor equipped with an agitator, a dropping funnel and maintained under a nitrogen atmosphere. A total of 130 parts of a 3% solution of LiAlH$_4$ in tetrahydrofuran, was added dropwise over a period of one hour, with the rate of addition being adjusted so that the temperature of the reaction mixture could be held below 35° C. After stirring another 10 minutes, the mixture was treated with alcohol, hydrochloric acid and washed with water. The liquid polymer remaining, after removing the solvent by vacuum evaporation at room temperature, had a mercaptan sulfur content of 3.6% and could be cured readily by the addition of lead peroxide to give a product having a solubility in benzene at 75° F. of less than 30%.

This mercaptan terminated polymer was reacted with polyallylglycidyl ether (1.2 equivalents per equivalent of the mercaptan terminated polymer) in presence of 1% by weight of tri-(dimethylamino) phenol to form a cured elastomer having a tensile of 270 pounds per square inch and an elongation of 80% at the break point. This cured elastomer had a solubility at 75° F. of 6% and a 3.6% volume swell.

The copolymers of sulfur and dienes useful in the practice of this invention can be prepared from those dienes having conjugated double bonds and containing from 4 to 10 carbon atoms. Inter polymers of these materials with each other or with mono alpha olefin containing from 2 to 20 and preferably 2 to 10 carbon atoms can be used. Representative examples of the mono alpha olefins are styrene, acrylonitrile, methacrylonitrile, acrylic acid, methacrylic acid, and the lower alkyl esters of acrylic acid and methacrylic acid where the alkyl radical has from 1 to about 20 carbon atoms with butyl acrylate and methyl methacrylate being representative examples.

The amount of the mono alpha olefin used to make the plastic or elastogenic sulfur copolymers cleavable in accordance with this invention varies rather broadly from 0 mol percent to as high as 95 mol percent of mono alpha olefins and higher. Generally the range of mono alpha olefins will be about 5 to 50 mol percent.

Some representative sulfur copolymers useful in this invention are those containing from 1 to 10% sulfur by weight made by copolymerization with the following olefinic materials:

(A) Butadiene
(B) 10–90% Butadiene, 90–10% styrene
(C) 10–90% Butadiene, 90–10% acrylonitrile
(D) Isoprene
(E) 10–90% Isoprene, 90–10% styrene
(F) 10–90% Isoprene, 90–10% acrylonitrile When the hydrogenolysis cleaving agent is the combination of finely divided zinc powder and hydrogen chloride or the acid, the solvents usually contain at least about 5% and preferably about 15 to 40% by weight of the water soluble carboxylic acids dissolved in an aromatic hydrocarbon of the type indicated hereinbefore. Water miscible alcohols may be used, too.

The cleavage with lithium aluminum hydride is highly exothermic and occurs spontaneously at room temperature. Therefore it is desirable in some instances to use some cooling and maintain a temperature from about 0° C. to 50° C. Use of the other alkali aluminum hydrides requires the use of similar temperature conditions.

EXAMPLE VIII

*Preparation of butadiene-sulfur copolymer*

A sulfur-butadiene copolymer was made by the procedure of Example I by substituting butadiene for isoprene and using 4.3 parts of sulfur. The polymerization was shortstopped at 55% conversion. This 55% conversion polybutadiene was readily cleaved by the method of Example II with the following cleaving recipe:

| Polymer | Parts |
|---|---|
| Latex | 100 |
| Benzene | 425 |
| Powdered zinc | 50 |
| Hydrochloric acid (36% HCl) | 125 |
| Isopropanol | 220 |

A clear, 17% solids cement formed when the agitation was stopped after one hour. This was found to contain 5.27% mercaptan sulfur (on solids basis) with a very strong odor of mercaptan.

Part of the high mercaptan (low molecular weight) material was removed by fractional precipitation by adding a volume of methanol equal to 50% of the volume of the cement. The lower layer consisting of a 37% solids cement with 3.03% mercaptan sulfur (on solids basis) was separated.

A portion of this mercaptan polymer was converted to the hydroxyl end group polymer by heating the 37% solids cement for 16 hours with two equivalents of ethylene oxide per equivalent of mercaptan at 50° C. using 0.3 part pyridine on the polymer as a catalyst. This gave a polymer with a hydroxyl equivalent of 1100 and no mercaptan content.

The mercaptan end group polybutadiene was cured 2 hours at 200° F. with 10 parts lead peroxide. The cured product was very porous, 26% soluble in benzene with a swelling volume of 15.

A mixture of 1.3 equivalents of polyallyl glycidyl ether and 1 equivalent of the mercaptan polymer was heated at 200° F. for 2 hours to obtain a cured product having a benzene solubility of 11% and a swell volume of 4.1.

Vinyl cyclohexene dioxide (1 eq.) and 1 eq. of the mercaptan end group polybutadiene were reacted at elevated temperature in the presence of gamma picoline to more than double the molecular weight.

The hydroxyl end group polybutadiene was cured 90′ at 200° F. with varying amounts of tolylene diisocyanate using 0.2 part pyridine as a catalyst to obtain an elastomer.

EXAMPLE IX

The polymer used in this example was formed by the copolymerization of the ingredients of a recipe containing by weight 75 parts butadiene, 25 parts styrene and 3.6 parts sulfur with the polymerization being carried to about 70% conversion. The polymer obtained from the latex was extracted for three days with acetone. The acetone extracted polymer (3 parts) was treated with dry toluene (100 parts) until the polymer exhibited appreciable swelling. A solution consisting of 15 parts of tetra hydrofuran and 0.5 part of lithium aluminum hydride was added to the swollen polymer in the toluene. The resulting mixture was shaken at frequent intervals and allowed to stand at room temperature. In a short time, about 10 minutes, a liquid phase appeared due to the cleaving of the swollen polymer. After the entire mixture became fluid sufficient ethyl alcohol was added slowly to the mixture to react with the total amount of lithium aluminum hydride present and thereby destroy the excess cleaving agent. The cleaved reaction mixture was acidified with HCl and then washed with sufficient water to remove alcohol and the other soluble components. The washed organic layer was filtered to remove any finely suspended lithium or aluminum salts. The solvent remaining in the organic phase was removed under a vacuum at room temperature. A typical analysis of the cleaved dry polymer showed the presence of 1.53% thiol sulfur and a total sulfur content of 2.23%.

EXAMPLE X

Stabilized cleaved product

Another batch of Latex 8257 was cleaved and recovered in accordance with the procedure of Example II except 1.5 parts of ditertiary butyl hydroquinone was used. One sample of the cleaved polymer was stored in the presence of air and another sample was stored in the absence of air. Table I shows the stabilization effect of this stabilization agent expressed in percent mercaptan.

TABLE 1.—STORAGE CONDITIONS

| Days, Number | Absence of Air, Mercaptan (percent) | Presence of Air, Mercaptan (percent) |
|---|---|---|
| 0 | 4.42 | 4.42 |
| 62 | 4.23 | 4.15 |
| 218 | 4.13 | 3.0 |

Table 2 shows the reduction in loss of active mercaptan groups achieved by treating each 100 parts of a cleaved sulfur-butadiene copolymer with 1.5 parts of ditertiary butyl hydroquinone and 1.7 parts of the synergistic agent shown in column 1.

TABLE 2

| Synergistic Agent | Mercaptan Analysis, Percent Days Storage | |
|---|---|---|
|  | 0 | 163 |
| No Phosphite | 4.40 | 2.80 |
| Tri-(J*-methyl-6-benzyl phenyl) phosphite | 4.40 | 3.65 |
| Tri-(J*-methyl-6-α-phenylethyl phenyl* phosphite | 4.40 | 3.75 |
| Tri-nonyl phenyl phosphite | 4.40 | 3.52 |

J* indicates a mixture where methyl is in either the 3 or 4 positions.

The compounded samples shown in Table 2 were stored in contact with air.

The cleaved sulfur-hydrocarbon copoylmer can be stabilized by treatment with the sterically hindered phenols which are divided into at least the monohydric phenols and the bis phenols. Representative examples of the monohydric phenols are those of Groups 1, 2, 3 and 4:

Group 1:
2,6 di-α-phenylethyl phenol
2,4 di-α-phenylethyl phenol
2,4 dimethyl-6-α-phenylethyl phenol
3,4 dimethyl-6-α-phenylethyl phenol
2,5 dimethyl-6-α-phenylethyl phenol
4-methyl-2-α-phenylethyl phenol
3-methyl-2-α-phenylethyl phenol
Reaction product of M.P. cresol and styrene
2,4,6 tri-α-phenylethyl phenol
2,α-phenylethyl phenol
4-αphenylethyl phenol
Reaction product of phenol and styrene-1:2 molar ratio
Reaction product of cresol and styrene-1:1 molar ratio
2-α-phenylethyl-4-methyl-6-tertiary butyl phenol
2-benzyl-4-methyl-6-tertiary butyl phenol
2,6-ditertiary butyl-4-α-phenylethyl phenol
2,4-di-α-phenylethyl phenol-6-tertiary butyl phenol
2-α-phenylethyl-3-methyl-6-tertiary butyl phenol.

Group 2:
2,4 ditertiary octylphenol
2,4 ditertiary nonyl phenol
2,4 ditertiary octyl-6-tertiary butyl phenol
2,4 ditertiary nonyl-6-tertiary butyl phenol
2,6 ditertiary butyl-4-tertiary octyl phenol
2,6 ditertiary amyl-4-tertiary nonyl phenol
2-tertiary butyl-4-tertiary octyl phenol
2-tertiary amyl-4-tertiary nonyl phenol
2-tertiary butyl-4-tertiary nonyl phenol
2-tertiary amyl-4-tertiary octyl phenol
2-tertiary octyl-4-tertiary butyl phenol
2-tertiary octyl-4-tertiary amyl phenol
2-tertiary nonyl-4-tertiary amyl phenol
2,4,6 tritertiary butyl phenol
2,4,6 tritertiary amyl phenol
2,4 ditertiary butyl phenol
2,4 ditertiary amyl phenol
2,6 ditertiary butyl phenol
2,6 ditertiary amyl phenol.

Group 3:
2-tertiary octyl-4-methyl phenol
2-tertiary butyl-4-methyl phenol
3-methyl-6-tertiary octyl phenol
3-methyl-6-tertiary butyl phenol
2,6 ditertiary butyl-4-methyl phenol
2,6 ditertiary butyl-3-methyl phenol
2,6 diamyl-4-methyl phenol
2,6 ditertiary hexyl-4-methyl phenol
2,6 ditertiary octyl-4-methyl phenol
2,6 ditertiary butyl-4-propyl phenol
2,6 ditertiary butyl-4-n-butyl phenol
2,6 ditertiary butyl-4-isobutyl phenol
2 tertiary butyl-4-proply phenol
2 tertiary hexyl-4-n butyl phenol
2 tertiary octyl-4-propyl phenol
2 tertiary butyl-4-methyl-6-tertiary amyl phenol
2 tertiary octyl-4-methyl-6-tertiary butyl phenol
6 tertiary octyl-3-methyl phenol
2,6 ditertiary butyl-4-ethyl phenol
2,6 ditertiary amyl-4-ethyl phenol.

Group 4:
2,4 dimethyl-6-tertiary butyl phenol
2,4 dimethyl-6-tertiary amyl phenol
2,4 dimethyl-6-tertiary octyl phenol
2,4 dimethyl-6-tertiary decyl phenol
2,5 dimethyl-6-tertiary butyl phenol
3,5 dimethyl-6-tertiary amyl phenol
3,4 dimethyl-6-tertiary butyl phenol
3,4 dimethyl-6-tertiary amyl phenol
3,4 dimethyl-6-tertiary octyl phenol
3,4 dimethyl-6-tertiary decyl phenol.

Usually about 0.5 to 5 parts of the phenol per 100 parts of the cleaved polymer gives noticeable improvement in stability.

Representative of the bis phenols are:

2,2' methylene bis(4 methyl-6-tertiary butyl phenol)
2,2' thio bis(4 methyl-6-tertiary butyl phenol)
2,2' methylene bis(4 methyl-6-tertiary amyl phenol)
2,2' thio bis(4 methyl-6-tertiary amyl phenol)
2,2' butlyidene bis(4 methyl-6-tertiary butyl phenol)
4,4' methylene bis(2 methyl-6-tertiary butyl phenol)
4,4' thio bis(2-methyl-6-tertiary butyl phenol)
2,2' methylene bis(3-methyl-6-tertiary butyl phenol)
2,2' thio bis(3 methyl-6-tertiary butyl phenol)
4,4' methylene bis(2,6 ditertiary butyl phenol)
4,4' thio bis(2,6 ditertiary butyl phenol) α,α'-dimethyl
4,4' methylene bis(2,6 ditertiary butyl phenol)

and alkylated octyl phenols, the ditertiary alkylated-4-methyl phenols. Also, the alkylated dihydroxarylenes can be used. The alkylated dihydroxarylenes contain tertiary alkyl radicals having from 4 to about 9 carbon atoms, for instance, ditertiary alkylhydroquinone. Also, it has been found that the organic phosphites exhibit a synergistic effect when used from about 0.2 to 5.0 parts and preferably 1.0 to 3.0 parts per 100 parts of the cleaved copolymer of the sulfur hydrocarbon with the sterically hindered phenols. This fact is demonstrated in Table II with the representative organic phosphites used. The preferred organic phosphites contain at least one phenol or alkaryl radical with the alkaryl radical usually containing less than about 12 carbon atoms.

The solubility of the lead peroxide cured polymer was determined by weighing 0.1 gram of the cured product into a flask. Then 25 ml. of benzene was added. The cured product and benzene were allowed to stand for 24 hours at 75° F. Then a 10 ml. aliquot of the benzene layer was taken from the flask and placed in a weighed flask. The benzene was evaporated on a hot plate and the flask was reweighed to obtain the weight of the soluble product.

While certain representative embodiments and details have been shown for the purpose of illustrating the invention, it will be apparent to those skilled in the art that various changes and modifications may be made therein without departing from the spirit or scope of the invention.

What is claimed is:

1. A composition of matter capable of reacting with lead dioxide to yield a cured product which has a solubility at 75° F. in benzene of less than 30 percent by weight and having the structure of $HSM_p(S_xH_q)_kSH$, where M is a monomer unit derived from a conjugated diene having from 4 to about 8 carbon atoms and a mono-alpha-olefin having from 2 to about 20 carbon atoms with the priviso that some of the M units are always derived from the conjugated diene and the M units derived from the mono-alpha-olefin may be zero; $p$, $q$ and $k$ are integers having values of at least 1 to values less than those where the sum of $p$, $q$ and $k$ give the composition a molecular weight of about 10,000; and $x$ is an integer having values of 0 to 8 with the priviso that at least some of the $x$ units must be at least 1.

2. The composition of claim 1 wherein $x$ has only the value of 1.

3. The composition of claim 2 wherein the M units are derived from the olefins selected from the class consisting of butadiene, isoprene and a mixture of butadiene and acrylonitrile.

4. The composition of claim 2 which contains on a 100 parts basis about 0.5 to about 5 parts of a sterically hindered phenolic substance and 0 to about 5 parts of an organic phosphite.

5. A method of producing a composition having the structure of $HSM_p(SM_q)_kSH$, where M is a monomer unit derived from a conjugated diene having from 4 to about 2 carbon atoms and a mono-alpha-olefin having from 2 to about 20 carbon atoms with the proviso that some of the M units are always derived from the conjugated diene and the M units derived from the mono-alpha-olefin may be zero; $p$, $q$ and $k$ are integers having values of at least 1 to values less than those where the sum of $p$, $q$ and $k$ give the composition a molecular weight of about 10,000; and $x$ is an integer having values of 0 to 8 with the proviso that at least some of the $x$ units must be at least 1 comprising the steps of (1) treating a compound having the formula $M_a(S_xM_b)_yS_t$, where M has the meaning indicated above, and $a$, $b$ and $y$ are integers having values of at least 1 to values less than those where the sum of $a$, $b$ and $y$ are sufficient to give a molecule having a molecular weight of about 50,000 to about 100,000 with sufficient aromatic solvent to swell the compound, and (2) then treating the smaller compound with a hydrolitic cleaving agent selected from the class consisting of lithium aluminum hydride and the combination of zinc and a non-oxidizing mineral acid.

6. The method of claim 5 wherein the hydrolitic agent is zinc and aqueous HCl.

References Cited

UNITED STATES PATENTS

| | | | |
|---|---|---|---|
| 3,332,914 | 7/1967 | Costanza | 260—79.5 |
| 3,338,875 | 8/1967 | Costanza et al. | 260—79.5 |

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,373,146                                  March 12, 1968

Glen E. Meyer et al.

It is certified that error appears in the above identified patent and that said Letters Patent are hereby corrected as shown below:

Column 1, line 58, "minieral" should read -- mineral --. Column 3, line 15, "actate" should read -- acetate --; line 19, "(cone)" should read -- (conc) --. Column 8, between lines 11 and 12, insert -- 2-tertiary nonyl-4-tertiary butyl phenol --; line 32, "proply" should read -- propyl --; line 61, "butlyidene" should read -- butylidene --. Column 9, line 26, "$HSM_p(S_xH_q)_kSH$" should read -- $HSM_p(S_xM_q)_kSH$ --; lines 30 and 36, "priviso", each occurrence, should read -- proviso --. Column 10, line 10, "2" should read -- 8 --.

Signed and sealed this 25th day of November 1969.

(SEAL)

Attest:

Edward M. Fletcher, Jr.                          WILLIAM E. SCHUYLER, JR.

Attesting Officer                                        Commissioner of Patents